E. L. MEYER.

Sewer-Basins.

No. 5,920. Reissued June 16, 1874.

Witnesses:
Emil Bilhuber
Chas Wahlers

Inventor:
Ernest L. Meyer
per
Van Santvoord & Hauff
attys

AM. PHOTO-LITHOGRAPHIC CO. N. Y. (OSBORNE'S PROCESS.)

UNITED STATES PATENT OFFICE.

ERNEST L. MEYER, OF ELIZABETH, NEW JERSEY.

IMPROVEMENT IN SEWER-BASINS.

Specification forming part of Letters Patent No. 150,072, dated April 21, 1874; reissue No. 5,920, dated June 16, 1874; application filed May 21, 1874.

*To all whom it may concern:*

Be it known that I, ERNEST L. MEYER, of Elizabeth, in the county of Union and State of New Jersey, have invented certain new and useful Improvements in Sewer-Basins, of which the following is a specification:

This invention is illustrated in the accompanying drawing, in which—

Figure 3:
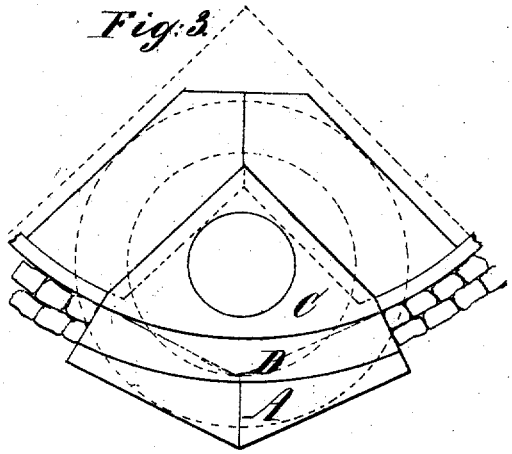
Figure 4:
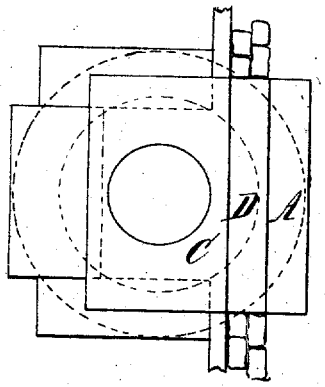
Figure 1:
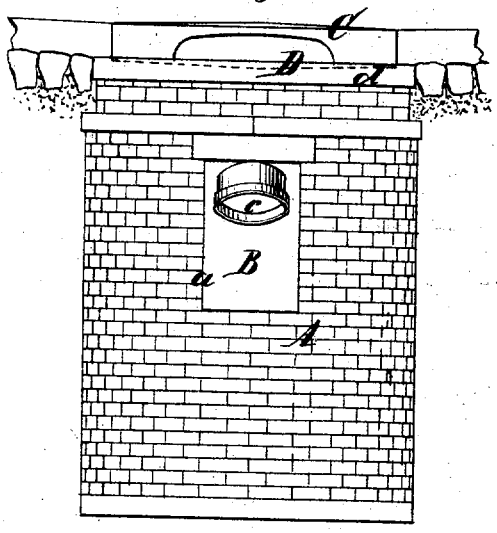
Figure 2:
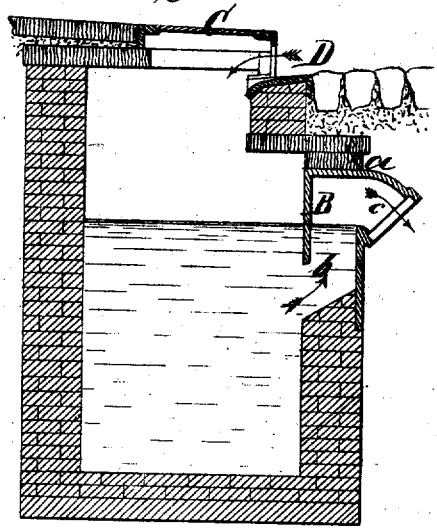
Figure 5:
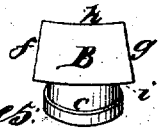
Figure 6:
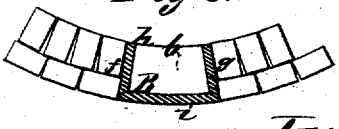

Figure 1 represents a front view of this invention. Fig. 2 is a vertical section of the same. Fig. 3 is a plan or top view of the same. Fig. 4 is a plan of a modification of the same. Fig. 5 is a detached top view of the trap. Fig. 6 is a transverse section of the same.

Similar letters indicate corresponding parts.

This invention consists in combining with a metallic basin-head a metallic flanged gutter-plate, the flange of which overlaps the edge of the basin and assists in forming a close and level joint with the pavement; also, in a trap, which is made detached from the basin, and which, when inserted into the wall of the basin, forms a portion of the wall of the same; further, in a trap made detached from the basin, and provided with two segmental and two flat sides, the radius of the inner segmental side corresponding to that of the inner surface of the basin, while its flat sides radiate toward the center from which the inner segmental side is described, so that the trap can be readily and quickly inserted into the basin, and, when inserted, its inner surface is flush with the inner surface of the basin.

In the drawing, the letter A designates a sewer-basin, which is, by preference, built up of brick in a cylindrical or in any other desirable form or shape. In the wall of this basin is an aperture, *a*, for the reception of the trap B, which is made of cast-iron, clay, or any other suitable material, vitrified clay, such as used for sewer-pipes, being used by preference. This trap is made in such a form that, when it is inserted in the basin, its inner wall is flush with the inner, and its outer wall with the outer, surface of the basin, as shown in Fig. 2; and the lower part of the trap is let into the outer wall of the basin, so that the trap is firmly retained in position. When the basin is made cylindrical, the trap is made with two segmental sides, *f g*, (Figs. 5 and 6,) and with two radial sides, *h i*, the radius of the inner side *g* of the trap corresponding to that of the basin. By this arrangement, the trap can be made of clay, metal, or any other desirable material, and it can be readily and easily inserted in an opening left for its reception in the wall of the basin. In the inner wall of the trap, near its bottom edge, is an aperture, *b*, and from the outer wall, at or near its top edge, projects a spout, *c*, which leads into the sewer, so that the liquid which accumulates in the basin A can freely flow out into the sewer, while the mud and dirt which are swept into the basin accumulate in its lower part, whence they have to be removed from time to time. The liquid accumulates in the basin until it covers the aperture *b* in the inner wall of the trap, and the entrance of noxious gases from the sewer is prevented.

By this trap, the interior room of the basin is left entirely unobstructed, and the operation of cleaning out said basin can be performed without difficulty. The basin-head C is, by preference, made of cast-iron, either triangular, as shown in Fig. 3, or quadrangular, as shown in Fig. 4. If it is made triangular, the operation of adjusting the adjoining flag-stones of the side-walk is facilitated. With this basin-head is combined a gutter-plate, D, which is cast of iron or made of any suitable material, and which is placed on the top edge of the basin, being provided with a flange, *d*, that overlaps said top edge, and allows of adjusting the adjoining paving-blocks with nicety, as indicated in Fig. 2. The inner edge of said gutter-plate is turned down, so as to retain the inner edge of the basin-wall in position, and form a free and unobstructed passage from the gutter into the basin. The sewer-basin is generally built up of brick, and, by providing a detached trap, such as above described, I am enabled to finish the sewer-basin, leaving an opening in its wall for the reception of the trap; and, by fitting this trap into the opening left for its reception in the basin, the basin is completed.

What I claim as new, and desire to secure by Letters Patent, is—

1. The combination of the flanged gutter-plate D with the basin-head C and basin A, substantially as set forth.

2. A trap for a sewer-basin, which is made detached from said basin, and provided with an aperture, *b*, near its bottom edge, and a discharge-spout, *c*, above, and which, when inserted into the wall of said basin, forms a portion thereof, substantially as described.

3. A trap for a sewer-basin, made detached from said basin, and having two segmental sides, *f g*, and two radial sides, *h i*, substantially as set forth.

In testimony that I claim the foregoing I have hereunto set my hand.

ERNEST L. MEYER.

Witnesses:
W. HAUFF,
E. F. KASTENHUBER.